United States Patent [19]

Farrell

[11] Patent Number: 5,246,329
[45] Date of Patent: Sep. 21, 1993

[54] MULTI-POSITION FLAT BED TRUCK

[76] Inventor: Richard J. Farrell, 21384 McClung, Southfield, Mich. 48075

[21] Appl. No.: 843,854

[22] Filed: Feb. 27, 1992

[51] Int. Cl.$^5$ .............................................. B60P 1/32
[52] U.S. Cl. ................................... 414/478; 414/480; 414/786
[58] Field of Search .................. 414/477–480, 414/494, 786; 298/12, 14

[56] References Cited

U.S. PATENT DOCUMENTS

| | | | |
|---|---|---|---|
| 2,588,001 | 3/1952 | Holland | 414/477 |
| 3,074,574 | 1/1963 | Prince | 414/477 |
| 3,127,041 | 3/1964 | Flynn et al. | 414/477 |
| 3,430,792 | 3/1969 | Grove et al. | 414/477 |
| 3,485,400 | 12/1969 | Pewthers | 414/477 |
| 4,645,405 | 2/1987 | Cambiano | 414/494 |
| 4,702,662 | 10/1987 | Marlett | 414/477 |
| 4,795,303 | 1/1989 | Bubik | 414/478 |
| 4,988,258 | 1/1991 | Lutz et al. | 414/480 X |

FOREIGN PATENT DOCUMENTS

| | | | |
|---|---|---|---|
| 0362096 | 4/1990 | European Pat. Off. | 414/478 |
| 3244244 | 7/1983 | Fed. Rep. of Germany | 414/480 |
| 2372050 | 7/1978 | France | 414/477 |
| 9108926 | 6/1991 | PCT Int'l Appl. | 414/478 |
| 1486380 | 6/1989 | U.S.S.R. | 414/480 |

Primary Examiner—David A. Bucci
Attorney, Agent, or Firm—Weintraub, DuRoss & Brady

[57] ABSTRACT

A flat bed truck for hauling vehicles of all types as well as other types of loads which includes a multi-positional flat bed to assist with loading and unloading the truck. The flat bed is slidable on a tilt frame and pivots away from the tilt frame and along the loading surface as the tilt frame is pivoted up and away from the truck. The fully extended loading position of the flat bed placing the front end of the flat bed below the undercarriage of the truck permits low clearance vehicles to be easily loaded onto the flat bed by a powered winch positioned on the flat bed. Also, the tilt frame is capable of rising to its full height to quickly dump loads that do not require extending the flat bed.

11 Claims, 3 Drawing Sheets

MULTI-POSITION FLAT BED TRUCK

BACKGROUND OF THE INVENTION

1. Field of the Invention:

This invention relates to the field of flat bed trucks. More particularly, this invention relates to trucks with multi-position beds. Even more particularly, this invention relates to trucks with powered multi-position beds.

2. Prior Art:

Trucks with flat beds are, generally, used for transporting all kinds of items and have been in use since the first days of truck manufacturing. Flat beds on the truck are, generally, fixed beds with limited or no movement.

However, some flat beds trucks have been equipped with lifts, such as hydraulic lifts, as well as split beds. With lifts, they are used to raise the front of the bed causing it to tilt toward the stationary or fixed rear of the bed. This permits any item, such as sand, gravel or the like, to be dumped from the flat bed at one time.

Furthermore, flat bed trucks have been used to transport large objects, such as vehicles, including automobiles, tractors and other self-powered vehicles. Loading and unloading these vehicles onto and from the flat bed of the truck has been accomplished by many methods.

One such method is to use a pair of manually positioned, spaced apart wheel ramps or a single ramp having one end thereof on the truck bed, the other end on the ground. The vehicle is then driven, pushed, or towed up the ramp to the desired position on the flat bed. The vehicle is, then, fixed in position and the ramp is removed.

Another method, regularly in use, and which requires little or no manual operation, employs a powered tailgate or rear platform located at the back end of the flat bed. The powered tailgate is of sufficient size to provide a loading ramp when lowered from the back end of the flat bed to the ground. When it is lowered to the ground, it performs as the manually positioned ramp or ramps perform. Then, the tailgate is raised and driven onto the bed and fixed in position for transport.

A further method for loading a flat bed truck is to back the flat bed against a stationary loading platform which is the same height as the truck. This permits the vehicle to be driven directly onto the bed.

All of the above methods are in common use, but each of the methods presents its own problems or use restrictions. Positionable ramps, whether manual or automatic, limit the bottom clearance for loading vehicles and cause damage to the undercarriage of those vehicles having a low road clearance. Stationary ramps are not always available at loading and unloading points. Thus, a flat bed truck which permits the loading and unloading of any type vehicle and which does not require ramps of any kind would be desirable. Moreover, to provide all of the advantages within a single flat bed truck would be highly desirable. It is to this to which the present invention is directed.

SUMMARY OF THE INVENTION

The present invention provides for a truck having a multi-positionable powered flat bed apparatus mounted on an undercarriage of the truck. The present invention, generally, comprises:

(a) a sub-frame, the sub-frame being removably attached to the undercarriage of the truck;

(b) a tilt frame pivotally attached to the sub-frame;

(c) means for raising the tilt frame from the sub-frame;

(d) a slidable flat bed pivotally attachable to the tilt frame, the flat bed being slidable between an unloading and a loading position;

(e) means for sliding the flat bed between the loading position and the unloading position; and (f) means for stabilizing the truck while the tilt frame and flat bed are in loading position.

The flat bed, tilt frame and sub-frame cooperate to place the flat bed at a desired location and loading angle with respect to the ground surface or loading surface. This defines the angle needed to provide the required ground clearance while loading a vehicle.

A power system for operating the means for sliding the flat bed and the means for tilting the tilt frame is contained within the flat bed truck. The power system is a hydraulic system or the like.

The means for sliding the flat bed and the means for lifting the tilt frame can operate independently or cooperatively with each other.

Other attendant advantages will be more readily appreciated as the same become better understood by reference to the following detailed description and considered in connection with the accompanying drawings, in which like references numerals designate like parts throughout the figures.

DESCRIPTION OF THE PREFERRED EMBODIMENTS

The instant invention, as depicted in FIGS. 1-9, is a truck 10 having a multi-positionable powered flat bed apparatus 20 mounted on an undercarriage 16 of the truck 10. The truck hereof, generally, comprises:

(a) a sub-frame 30, the sub-frame 30 being removably attached to the undercarriage 16 of the truck 10;

(b) a tilt frame 40, the tilt frame 40 being pivotally attachable to the sub-frame 30;

(c) means 50 for raising the tilt frame 40 from the sub-frame 30;

(d) a slidable flat bed 60, the flat bed 60 being pivotally attachable to the tilt frame 40; the flat bed 60 being slidable between an unloading and loading position;

(e) means 70 for sliding the flat bed 60 between the loading position and the unloading position; and (f) means 80 for stabilizing the truck while the tilt frame 40 and flat bed 60 are in a loading position.

The sub-frame 30 defines a base 32 for the entire flat bed apparatus 20. The sub-frame 30 comprises a pair of mounting rails 34, 34' removably attached to the undercarriage 16 by means for mounting 36, such as mounting brackets 38, only one of which is shown. Fastening members such as bolts and nuts or the like secure the brackets in position.

The undercarriage 16 defines the support frame for the cab 12, engine, etc. of the truck 10.

The sub-frame 30 is tack welded to the undercarriage 16 until it can be fastened with the bolts and nuts.

The sub-frame 30 has a first end 100a and a second end 100b. The first end 100a is positioned proximate to the cab 12 of the truck 10. A cross bar 102 is securely fixed, such as by welding to the mounting rails 34, 34' at the first end 100a of the sub-frame 30.

The second end 100b is positioned proximate the rear 18 of the undercarriage 16. The sub-frame 30 does not move after it is attached to the undercarriage 16 of the truck 10. Pivoting brackets 104, 104' used by the tilt frame 40 is located proximal the second end 100b of the sub-frame 30. The pivoting bracket 104, 104' is securely fixed to an end plate 106 which is securely welded to the second end 100b of the sub-frame 30.

The tilt frame 40 is removably attached to the sub-frame 30. The tilt frame 40 is multi-positional between an angle ranging from about 0° to a maximum of about 40°, as shown in FIGS. 3–6. The positional angle of the tilt frame 40 is set independently or cooperatively with the slidable flat bed 60.

The tilt frame 40, preferably, comprises at least two elongated beams 42, 42' such as "I" beams or the like. The beams 42, 42' each have a first end 44a and a second end 44b. A first cross-member 46a is disposed proximate the first end 44a of the beams 42, 42'. The first cross-member 46a is securely mounted by welding or the like to the beams 42, 42'. A second cross-member 46b is located substantially medially to the first end 44a and the second end 44b of the beams 42, 42'. The second cross-member 46b is securely mounted by welding or the like to the beams 42, 42'. A third cross-member 46c is located medially to the second cross-member 46b and the second end 44b of the beams 42, 42'. The third cross-member 46c is securely mounted by welding or the like to the beams 42, 42'.

An attaching hinge or bracket 48, 48' is securely mounted by welding or the like to each beam 42, 42' medially to the third cross member 46c and the second end 44b of the beam 42, 42'. Also, the attaching bracket 88, 48' is removably attached to the pivot brackets 104, 104' of the sub-frame 30. The attaching brackets 48, 48' and pivot brackets 104, 104' define the pivot points 108, 108' for the tilt frame 40.

Figure 7:
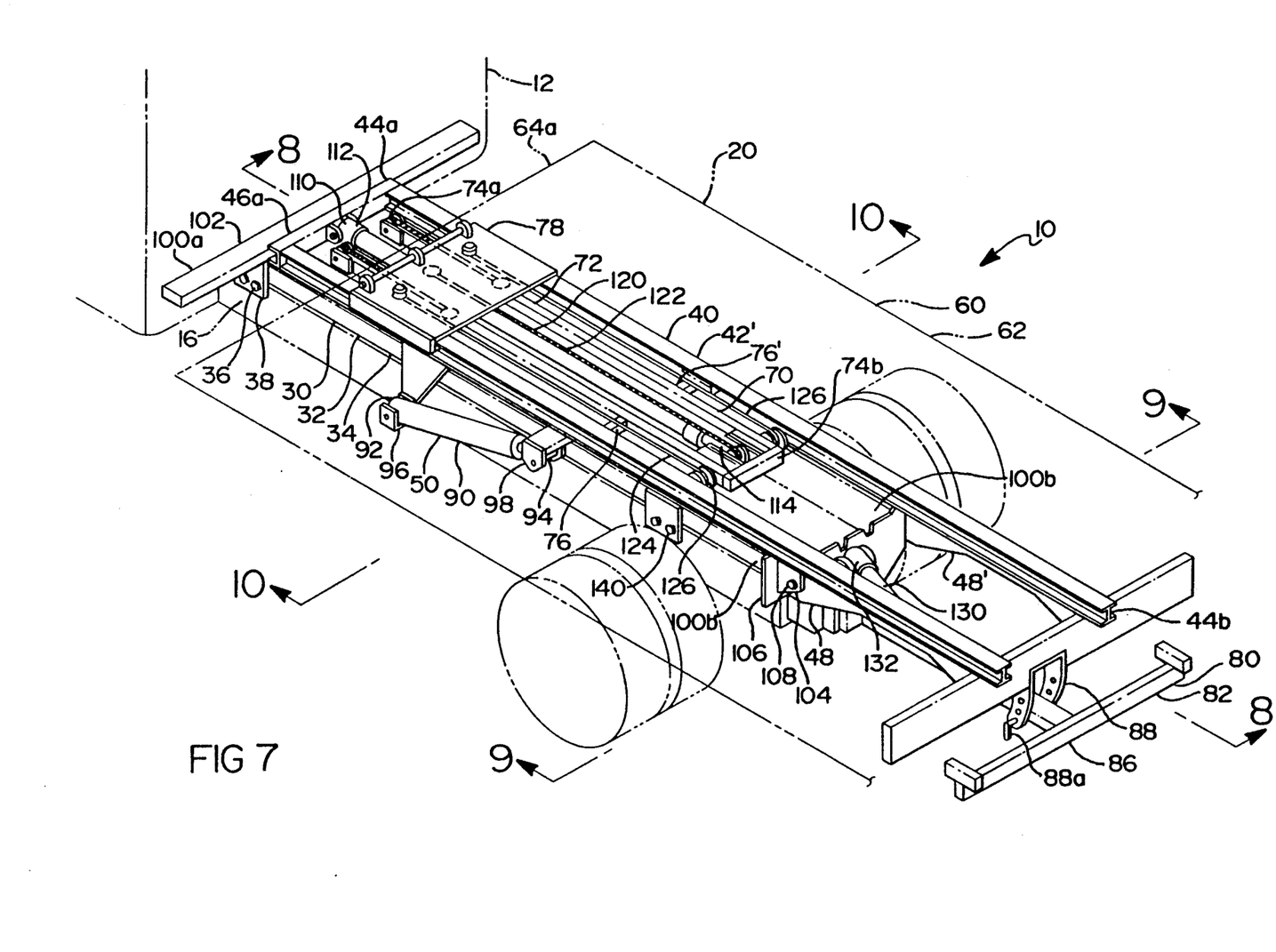
FIG. 7 is a prospective view of the multi-positioned flat bed in a closed position.
Figure 8:
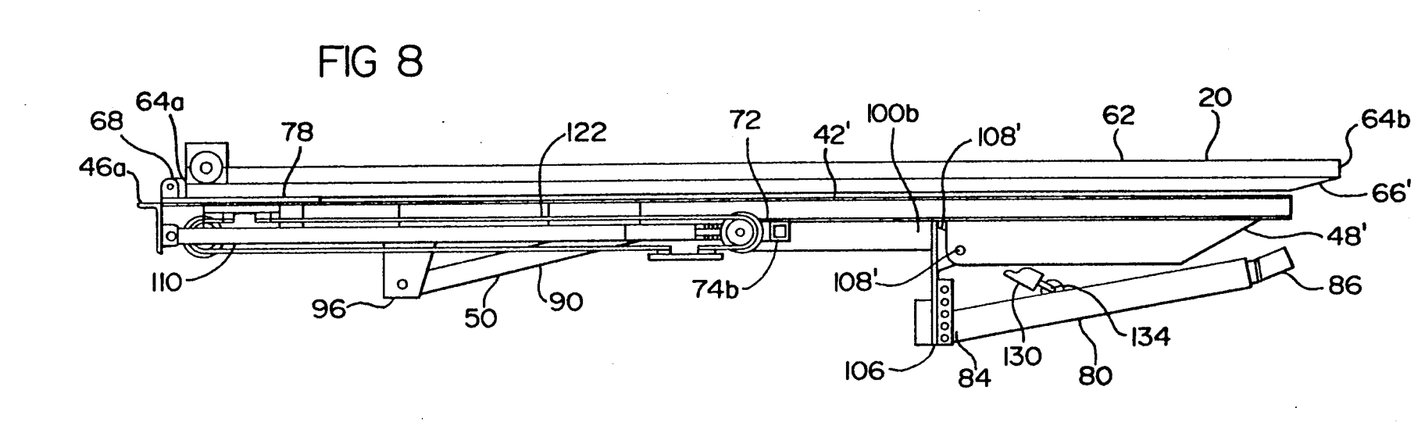
FIG. 8 is a cross-sectional view of the instant invention with the flat bed in a closed position.
Figure 9:
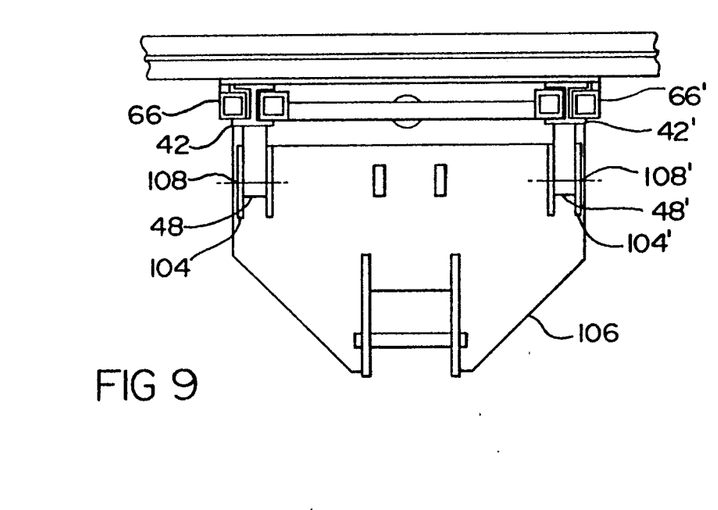
FIG. 9 is a cross-sectional view of the pivot points of the tilt frame and sub-frame of the instant invention with the flat bed in a closed position.

Referring to FIG. 7, the means for raising 50 the tilt frame 40, preferably, comprises at least one cylinder 90. The cylinder 90 has a body end 92 and a rod end 94. The body end 92 is removably attached to a body bracket 96 securely mounted by welding or the like on the sub-frame 30. The rod end 94 is removably attached to a rod bracket 98 securely mounted by welding or the like on the second cross-member 46b of the tilt frame 40. The cylinder 90 is in communication with a power source (not shown) which provides the power to operate the cylinder 90 and raise and lower the tilt frame 40. The preferred power source is a hydraulic power source but pneumatic or electric power sources may be used.

Figures 2, 3, 4:
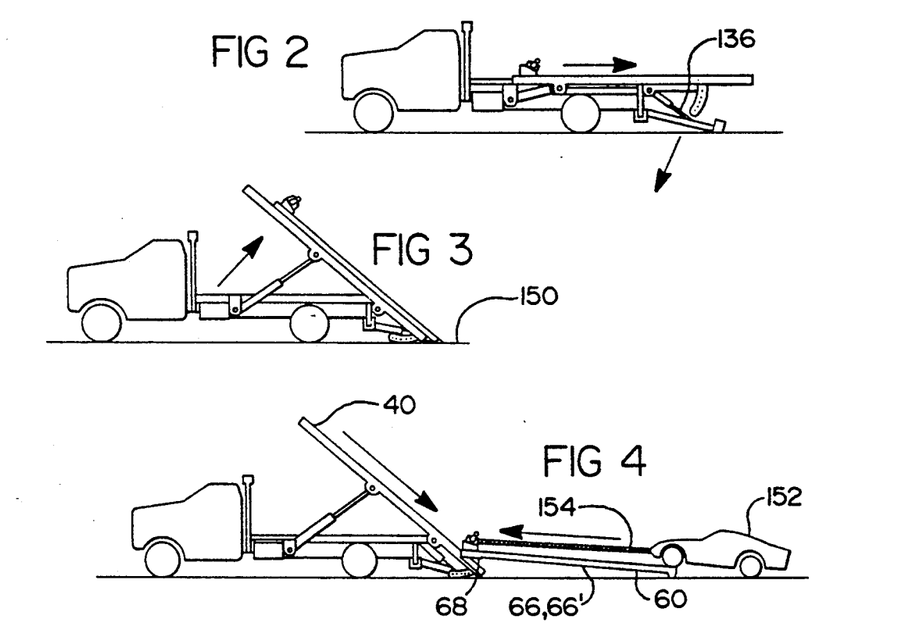
FIG. 2 is a side view of the truck hereof with the flat bed partially extended and with the stabilizer down.
FIG. 3 is a side view of the truck hereof with the flat bed partially extended and with the tilt frame fully raised and the means for stabilization in position.
FIG. 4 is a side view of the instant invention with the flat bed fully extended, the tilt frame fully raised; the means for stabilizing in position and the vehicle partially loaded on the flat bed.

The slidable flat bed 60, as shown in FIGS. 2–6 is multi-positional and cooperates with the tilt frame 40. The flat bed 60 is, preferably, positionable from an angle of about 0° to a maximum of about 40° while the flat bed 60 remains on the tilt frame 40. In a fully open or extended position from the tilt frame 40, the flat bed 60 is at an angle of about 4° to the ground or loading surface 150, as shown in FIG. 4.

Referring to FIGS. 4 through 9, the flat bed 60 comprises a flat platform 62 for supporting a load 152. The platform 62 has a first end 64a and a second end 64b. At least two slide rails 66, 66' are removably mounted on the bottom surface of the platform 62. The slide rails 66, 66' are slidable on the beams 42, 42' of the tilt frame 40. A pivot plate 68 is securely attached by welding or the like to the slide rails 66, 66' proximate the first end 64a of the platform 62. The pivot plate 68 is removably attached to the means 70 for sliding the flat bed 60. The pivot plate 68 cooperates with the means 70 for sliding to pivot the flat bed 60 away from the tilt frame 40.

Figure 5:
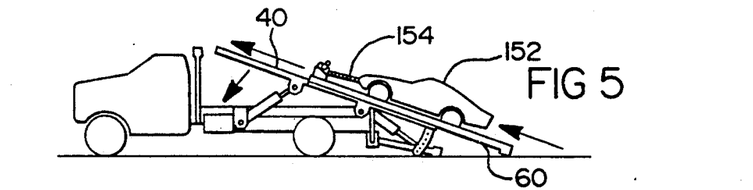
FIG. 5 is a side view of the instant invention with the flat bed partially retracted, and with the tilt frame partially retracted, means for stabilizing in position, and with the vehicle fully loaded.

The means 70 for sliding the flat bed 60 is removably attached by fastening members (not shown) to the tilt frame 40 and comprises a positioning frame 72. The positioning frame 72 has a first end 74a, a second end 74b, and at least one, but preferably, a pair of sliding cross-members 76, 76' proximate the second end 74b of the positioning frame 72. The sliding cross-members 76, 76' are securely attached by welding or the like to the positioning frame 72 and slidingly urge against the flange and the side of the beams 42, 42' of the tilt frame 40. The means 70 for sliding, also, includes a pivot platform 78 proximate the first end 74a of the positioning frame 72. The pivot platform 78 is securely attached by welding or the like to the positioning frame 72, is slidingly urging against the top surface of the beams 42, 42' of the tilt frame 40 and is pivotally attached to the pivot plate 68 of the flat bed 60. The means 70 for sliding further includes a cylinder 110. The cylinder 110 has a body end 112 and a rod end 114. The body end 112 of the cylinder 110 is removably attachable to the first cross-member 44a of the tilt frame 40. The rod end 114 of the cylinder 110 is removably attachable to the second end 74b of the positioning frame 72. The cylinder 110 is, preferably, powered by a hydraulic power source (not shown) for extending and retracting the flat bed 60, as shown in FIGS. 2 and 5, but pneumatic and electric power sources may be used.

Figure 1:
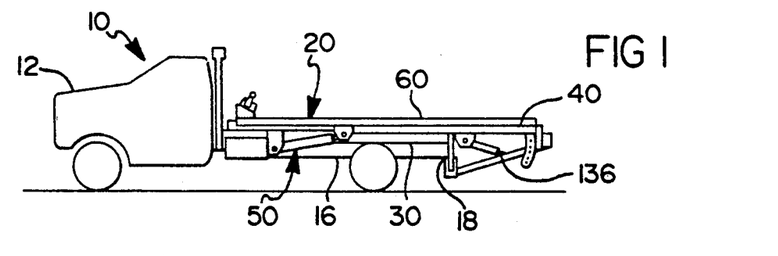
FIG. 1 is a side view of the truck of the present invention with the flat bed in an unloaded and closed position.

As shown in FIGS. 1, 4 and 7, the means 70 for sliding further includes an extending pulley system 120 to assist the cylinder 110. The pulley system 120 includes a first cable 122 removably attachable to the pivot platform 78 of the positioning frame 72 at one end and the third cross-member 46a of the tilt frame 40 at the other end. The extending pulley system 120 cooperates with the cylinder 110 to slide the flat bed 60 from its retracted position (FIG. 1) to its fully extended position (FIG. 4).

Figure 6:
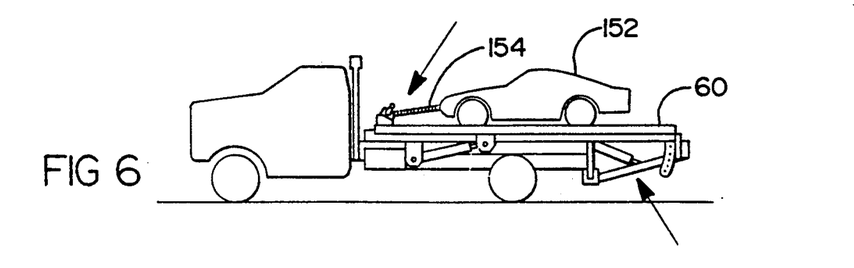
FIG. 6 is a side view of the instant invention with the flat bed, tilt frame and means for stabilizing in a closed position and the vehicle fully loaded.

A retracting pulley system 124, including a pair of second cables 126, 126', is removably attachable to the pivot platform 78 at one end and the second cross-member 46b of the tilt frame 40 at the other end. The retracting pulley system 124 cooperates with the cylinder 110 to retract the flat bed 60 from its loading position (FIG. 4) to its retracted position (FIG. 6).

The means 80 for stabilizing the truck 10 during loading is pivotally attached to the end plate 106 of the sub-frame 30 at the rear end 31 of the undercarriage 16. The means 80 for stabilizing comprises a support frame 82 having a pivot end 84 and a support end 86. The pivot end 84 is removably attachable to the end plate 106 of the sub-frame 30. The support end 86 rests on the loading surface 150. A cylinder 130, having a body end 132 and a rod end 134, is removably attachable to the end plate 106. The rod end 134 is removably attachable to the support frame 82 approximately medial to the pivot end 84 and the support end 86 of the support frame 82. The cylinder 130 raises and lowers the support frame 82 by retracting and extending the rod 136 of the cylinder 130.

The support frame 82 is retracted and in an "up" position when the flat bed 60 is in its fully retracted position. The support frame 82 is locked in place to a locking bracket 88 by a locking rod 88a or the like when it is retracted. The locking bracket 88 is securely mounted by welding or the like to the tilt frame 40.

The means 36 for mounting the flat bed apparatus 20 to the undercarriage 16 of the truck removably attaches the flat bed apparatus 20 to the undercarriage 16. The means 36, preferably, comprises fastening devices 140 such as nuts and bolts or the like, which removably attach the sub-frame 30 to the undercarriage 16 after the sub-frame 30 is tack welded to hold it in place.

In use, the tilt frame 40 can be raised to its maximum angle without repositioning the flat bed 60. This permits the truck to quick dump material such as sand and gravel.

Moreover, the tilt frame 40 and the flat bed 60 cooperate to achieve a best angle on the flat bed 60 for loading and unloading a vehicle. The tilt angles of the tilt frame 40, the pivoting relationship of the flat bed 60 and the means for sliding 70 cooperatively define the loading position of the flat bed apparatus which is below the undercarriage of the truck.

The preferred method for positioning the flat bed 60 for loading vehicles 152 comprises:

(a) raising the front portion 44a of the tilt frame 40 to a predetermined angle, such as about 5° from the sub-frame 30 such that gravity will assist the means for sliding 70 to move the flat bed 60;

(b) sliding the flat bed 60 to the rear of the tilt frame 40 to a point where the first end 64a of the flat bed 60 is medial to the front portion 44a and the rear portion 44b of the tilt frame 40;

(c) raising the front portion 44a of the tilt frame 40 to an angle from the sub-frame 30 such that gravity provides greater assistance for sliding the flat bed 60, for example, to a maximum of about 40°;

(d) sliding the first end 64a of the flat bed 60 to the rear portion 44b of the tilt frame 40 such that the second end 64b of the flat bed 60 makes contact with the loading surface 150;

(e) pivoting the second end 64b of the flat bed 60 away from the tilt frame 40 along the loading surface 150 until the first end 64a of the flat bed 60 is below the pivot point 108 of the tilt frame 40 and the sub-frame 30, for example, the flat bed 60 is at an angle of about 4° with the loading surface 150;

(f) hooking a winch cable 154 to a vehicle 152;

(g) pulling the vehicle 152 up the incline of the flat bed 60 to the first end 64 a of the flat bed 60;

(h) lowering the tilt frame 40 until the flat bed 60 pivots to and is resting on the tilt frame 40;

(i) retracting the flat bed 60 until the first end 64a of the flat bed 60 is proximate to the front portion 44a of the tilt frame 40; and (j) lowering the tilt frame 40 while retracting the flat bed 60 until the tilt frame 40 is resting on the sub-frame 30.

Alternatively, the vehicle 152 may be pushed onto the flat bed 60, pulled onto the flat bed 60 by another method not using the winch cable 154 or driven onto the flat bed 60.

It is to be appreciated that by the practice hereof, the bed extends rearwardly of the rear tires and beyond the pivot point of the lift frame. Thus, by raising the tilt frame to a full upright position, the front of the bed is lowered to a point lower than the pivot point of the tilt frame. Thus, the bed winds up below the sub-frame.

While the invention has been described in conjunction with specific embodiments, it is evident that many alternatives, modifications and variations will be apparent to those skilled in the art in light of the disclosure herein. It is intended that all such alternatives, modifications and variations are included herein that fall within the spirit and scope of the appended claims.

Having, thus, defined the invention, what is claimed is:

1. A truck having a multi-positionable powered flat bed apparatus mounted on an undercarriage, comprising:
   (a) a sub-frame attachable to the truck, the sub-frame having a first end and a second end, the first end proximate a front portion of the undercarriage and the second end proximate a rear portion of the undercarriage;
   (b) a tilt frame pivotally attached to the second end of the sub-frame, the tilt frame having a front portion and a rear portion, the rear portion of the tilt frame being pivotally attachable to the second end of the sub-frame;
   (c) means for raising the tilt frame from the sub-frame comprising at least one cylinder, the at least one cylinder having a body end and a rod end, the body end being attachable proximate the first end of the sub-frame and the rod end being attachable to the tilt frame;
   (d) a slidable flat bed slidingly mounted on the tilt frame, the flat bed having a front end and a rear end, the front end being proximate the front portion of the tilt frame, the rear end being proximate the rear portion of the tilt frame, the slidable flat bed comprising:
   (1) a platform for supporting a load, the platform having a first end and a second end, the first end of the platform proximate to the front portion of the tilt frame and the second end of the platform proximate to the rear portion of the tilt frame;
   (2) a pair of slide rails securely attached to the platform, the slide rails slidingly mounted on the beams of the tilt frame;
   (3) a pivot plate, the pivot plate securely attached to the slide rails and platform proximate to the front end of the platform, the pivot plate pivotably attachable to the means for sliding the flat bed; and (e) means for sliding the flat bed a loading position rearward of the sub-frame, the means for sliding being attachable to the tilt frame and pivotally attachable to the pivot plate of the flat bed; and wherein the pivot plate and platform cooperate to position the slidable flat bed relative to the tilt frame;

further wherein the tilt frame and the flat bed cooperate with the means for raising the tilt frame and means for sliding the flat bed to define a loading position of the flat bed apparatus.

2. The truck of claim 1 wherein the sub-frame comprises:
   (a) a pair of mounting rails:
   (b) a first cross bar proximate to the first end of the sub-frame, the first cross bar being securely attached to the mounting rails;
   (c) an end plate proximate the second end of the sub-frame, the end plate being securely attached to the mounting rails;
   (d) a pair of pivoting brackets being securely attached to the end plate;
   (e) a stabilizer locking bracket removably attached to the second end of the sub-frame; and
   (f) means for mounting the sub-frame to the truck.

3. The truck of claim 2 wherein the tilt frame comprises:
   (a) a pair of beams, each beam having a first end at the front portion of the tilt frame and a second end at the rear portion of the tilt frame;
   (b) a first cross-member proximate to the first end of the beams, the first cross-member securely attached to the beams;
   (c) a second cross-member medial to the first end and the second end of the beams, the second cross-member securely attached to the beams, the second cross-member removably attachable to the means for raising the tilt frame;
   (d) a third cross-member medial to the second cross-member and the second end of the beams, the third member securely attached to the beams; and
   (e) a pair of pivot brackets, each pivot bracket securely attached to a beam proximate to the second end of the beams, the pivot brackets removably attached to the pivoting brackets of the sub-frame.

4. The powered flat bed apparatus of claim 1, wherein the slidable flat bed further comprises:
   a powered winch mountable to the first end of the platform.

5. The powered flat bed apparatus of claim 1, wherein the means for sliding the platform comprises:
   (a) a positioning frame, the positioning frame having a first end and a second end, the first end of the positioning frame proximate to the front portion of the tilt frame and the second end of the positioning frame proximate to the rear portion of the tilt frame, the positioning frame comprising:
      (1) a pair of side bars;
      (2) a pair of sliding cross-members median to the first and second ends of the positioning frame, the cross-members being securely attached to the side bars, the cross-members being slidingly urging against the beams of the tilt frame;
      (3) an end cross-member, the end cross-member being securely attached to the second ends of the side bars;
      (4) a pair of first pulleys, the pulleys being rotably mounted to the first end of the side bars; and
      (5) three second pulleys, the pulleys being rotatably mountable proximate to the second end of the side bars, the pulleys having two side pulleys and one middle pulley;
   (b) a pivot platform, the platform securely attached proximate to the first end of the side bars, the platform being slidingly mounted to the beams of the tilt frame, the pivot platform being pivotally attachable to the pivot plate of the flat bed;
   (c) a cylinder, the cylinder having a body end and a rod end, the body end of the cylinder being removably attached to the first cross-member of the tilt frame and the rod end of the cylinder being removably attachable to the end cross-member of the positioning frame;
   (d) an extending cable system, the cable system having a cable removably attached to the pivot platform at one end and the third cross-member of the tilt frame at the other end, the cable slidingly mounted around the middle pulley of the three second pulleys;
   (e) a retracting cable system comprising two cables removably attached to the pivot platform at one end and the second cross-member of the tilt frame at the second end, the cables slidingly mounted around the pair of first pulleys of the positioning frame and the two side second pulleys of the positioning frame.

6. The truck of claim 2 wherein the flat bed apparatus further comprise a means for stabilizing the truck which includes:
   (a) a support frame, the support frame having a pivot end and an opposing support end, the pivot end being removably attachable to the end plate of the sub-frame;
   (b) a cylinder, the cylinder having a body end and a rod end, the body end of the cylinder removably attachable to the end plate of the sub-frame and the rod end removably attachable to the support frame median to the pivot end and the support end.

7. The truck of claim 2 wherein the means for mounting the sub-frame to the truck includes:
   (a) a plurality of mounting brackets attached to the mounting rails and undercarriage; and
   (b) a plurality of fasteners insertable within cooperating apertures formed in the mounting brackets attached to the mounting rails of the sub-frame and the undercarriage of the truck.

8. A method of loading a vehicle on to a flat bed of a truck which comprises:
   (a) raising the front portion of the tilt frame to a minimum angle from the sub-frame such that the pull of gravity on the flat bed will assist the means for sliding to move the flat bed;
   (b) sliding the flat bed to the rear of the tilt frame such that the first end of the flat bed is medial to the front portion and the rear portion of the tilt frame;
   (c) raising the front portion of the tilt frame to a maximum angle from the sub-frame such that gravity assists the means for sliding the flat bed;
   (d) sliding the first end of the flat bed to the rear portion of the tilt frame such that the second end of the flat bed makes contact with the loading surface;
   (e) lowering the means for sliding the flat bed such that the pivot plate of the flat bed pivots away from the pivot platform;
   (f) pivoting the second end of the flat bed away from the tilt frame along the loading surface until the first end of the flat bed is beyond and below the pivot brackets of the sub-frame;

(g) loading the vehicle up the incline of the flat bed to the first end of the flat bed;

(h) lowering the tilt frame until the pivot plate of the flat bed pivots to and urges against the pivot platform and is resting on the tilt frame;

(i) retracting the flat bed until the first end of the flat bed is proximate to the front portion of the tilt frame; and (j) lowering the tilt frame while retracting the flat bed until the tilt frame is resting on the sub-frame.

9. The method of claim 8 wherein loading includes: hooking the vehicle to a winch cable such that the vehicle can be pulled onto the flat bed.

10. The method of claim 8 wherein loading includes pushing the vehicle onto the flat bed.

11. The method of claim 8 wherein loading includes: driving the vehicle onto the flat bed.

* * * * *

UNITED STATES PATENT AND TRADEMARK OFFICE
CERTIFICATE OF CORRECTION

PATENT NO. : 5,246,329  
DATED : September 21, 1993  
INVENTOR(S) : Richard J. Farrell Page 1 of 5

It is certified that error appears in the above-indentified patent and that said Letters Patent is hereby corrected as shown below:

The title page, should be deleted to appear as per attached title page.

Signed and Sealed this

Fourteenth Day of June, 1994

Attest:

BRUCE LEHMAN

*Attesting Officer*   *Commissioner of Patents and Trademarks*

United States Patent [19]

Farrell

[11] Patent Number: 5,246,329
[45] Date of Patent: Sep. 21, 1993

[54] MULTI-POSITION FLAT BED TRUCK

[76] Inventor: Richard J. Farrell, 21384 McClung, Southfield, Mich. 48075

[21] Appl. No.: 843,854

[22] Filed: Feb. 27, 1992

[51] Int. Cl.⁵ .............................................. B60P 1/32
[52] U.S. Cl. ................................. 414/478; 414/480; 414/786
[58] Field of Search .......................... 414/477–480, 414/494, 786; 298/12, 14

[56] References Cited

U.S. PATENT DOCUMENTS

| | | | |
|---|---|---|---|
| 2,588,001 | 3/1952 | Holland | 414/477 |
| 3,074,574 | 1/1963 | Prince | 414/477 |
| 3,127,041 | 3/1964 | Flynn et al. | 414/477 |
| 3,430,792 | 3/1969 | Grove et al. | 414/477 |
| 3,485,400 | 12/1969 | Pewthers | 414/477 |
| 4,645,405 | 2/1987 | Cambiano | 414/494 |
| 4,702,662 | 10/1987 | Marlett | 414/477 |
| 4,795,303 | 1/1989 | Bubik | 414/478 |
| 4,985,258 | 1/1991 | Lutz et al. | 414/480 X |

FOREIGN PATENT DOCUMENTS

| | | | |
|---|---|---|---|
| 0362096 | 4/1990 | European Pat. Off. | 414/478 |
| 3244244 | 7/1983 | Fed. Rep. of Germany | 414/480 |
| 2372050 | 7/1978 | France | 414/477 |
| 9108926 | 6/1991 | PCT Int'l Appl. | 414/478 |
| 1486380 | 6/1989 | U.S.S.R. | 414/480 |

Primary Examiner—David A. Bucci
Attorney, Agent, or Firm—Weintraub, DuRoss & Brady

[57] ABSTRACT

A flat bed truck for hauling vehicles of all types as well as other types of loads which includes a multi-positional flat bed to assist with loading and unloading the truck. The flat bed is slidable on a tilt frame and pivots away from the tilt frame and along the loading surface as the tilt frame is pivoted up and away from the truck. The fully extended loading position of the flat bed placing the front end of the flat bed below the undercarriage of the truck permits low clearance vehicles to be easily loaded onto the flat bed by a powered winch positioned on the flat bed. Also, the tilt frame is capable of rising to its full height to quickly dump loads that do not require extending the flat bed.

11 Claims, 3 Drawing Sheets

FIG 7

UNITED STATES PATENT AND TRADEMARK OFFICE
CERTIFICATE OF CORRECTION

PATENT NO. : 5,246,329
DATED : September 21, 1993
INVENTOR(S) : Richard J. Farrell It is certified that error appears in the above-identified patent and that said Letters Patent is hereby corrected as shown below:

Column 3, Line 13: After "such" insert --a plurality of --.
Column 6, Line 63: After "frame;" insert --and--.
Column 7, Line 1: After "bed", insert --to--.
Column 7, Line 46: Delete "powered flat bed apparatus", insert --truck--.
Column 7, Line 50: Delete "powered flat bed apparatus", insert --truck--.
Column 7, Line 51: Delete "platform", insert --flatbed.
Column 8, Line 30: Change "comprise" to --comprises--.

Figure 10:
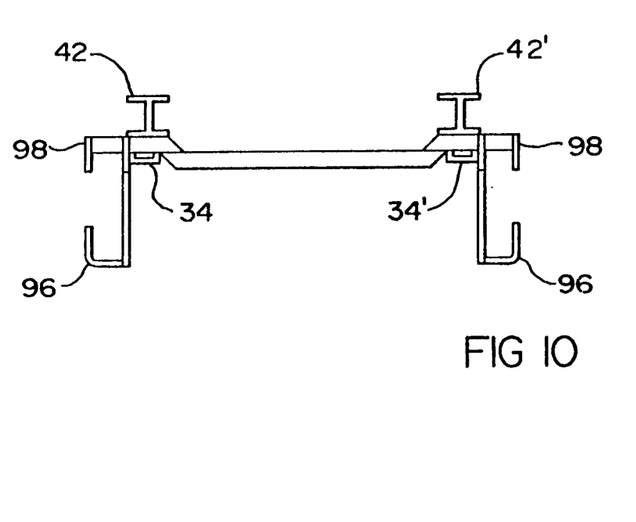
FIG. 10 is a cross-sectional view of the positioning frame with the flat bed in closed position.

In the drawings, Sheet 2, Figure 7: the reference numeral 46b should be applied to the second cross-member element attached to beams 42 and 42' and rod brackets 98; the reference numeral 46c should be applied to the third cross-member element attached to beams 42, 42' between the second cross-member 46b and the second end 44b of the beams 42, 42'; the reference numeral applied to the second cables 126, 126 should read 126 for the cable proximate to and parallel with the beam 42 and 126' for the cable proximate to and parallel with the beam 42'; Sheet 3, Figure 10: the reference numeral 46b should be applied to the second cross-member element attached to beams 42 and 42'.

UNITED STATES PATENT AND TRADEMARK OFFICE
CERTIFICATE OF CORRECTION

PATENT NO. : 5,246,329  
DATED : September 21, 1993  
INVENTOR(S) : Richard J. Farrell Page 4 of 5

It is certified that error appears in the above-identified patent and that said Letters Patent is hereby corrected as shown below:

FIG 7

UNITED STATES PATENT AND TRADEMARK OFFICE
CERTIFICATE OF CORRECTION

PATENT NO. : 5,246,329
DATED : September 21, 1993
INVENTOR(S) : Richard J. Farrell It is certified that error appears in the above-identified patent and that said Letters Patent is hereby corrected as shown below:

FIG 10